May 28, 1935.  N. BELAEF  2,002,686

MULTIPLE PEN RECORDER

Filed July 30, 1934

Inventor.
Nikolai Belaef
By Macleod, Calver, Copeland + Dike
Attorneys

Patented May 28, 1935

2,002,686

UNITED STATES PATENT OFFICE 2,002,686

MULTIPLE PEN RECORDER

Nikolai Belaef, Boston, Mass., assignor to Eldon Macleod, Frank A. Morrison, Cameron Macleod, Leslie Soule, and Sullivan A. Sargent, Jr., trustees, doing business as Mason-Neilan Regulator Company, Boston, Mass.

Application July 30, 1934, Serial No. 737,545

3 Claims. (Cl. 234—1)

This invention relates to instruments for indicating temperatures, pressures, liquid level and the like as transmitted independently from different places and more particularly to multiple pen instruments for providing simultaneous records of such indications.

In multiple pen recorders, pen arms of equal length have been mounted to pivot about centers spaced equidistant upon a circle subscribed about the center of a circular rotatable chart. Such an arrangement provides a constant time interval between the pen points but the time interval is large, particularly, at the outer half or two thirds of the chart where the most important indications occur. Because of this large time interval, it is inconvenient to correlate the various indications.

It has been attempted to overcome this difficulty by an arrangement in which pen arms of slightly different lendgths are mounted to pivot about a common point. However, with such an arrangement, while the time interval between the pen points is small, it varies continuously between the inner and outer limits of the chart. Because of this variable time interval, the indications obtained are confusing.

It is an object of the present invention to overcome these difficulties and provide an instrument of this general character in which the pen movements are such that the time interval between pen points is small and constant over that portion of the chart where the most important indications occur which is usually the outer half or two-thirds of the chart. Throughout this specification and the appended claims, it is intended that pen arms and pens shall mean either a pointer which will provide indications by observation of its movement with reference to a chart or graduated scale, or a device for providing a permanent visible record of such indications.

The invention will be more clearly understood from the following description in conjunction with the accompanying drawing: in which, Fig. 1 is a plan view, with the top cover removed, of a multiple pen recording instrument embodying the invention;

Figure 1:
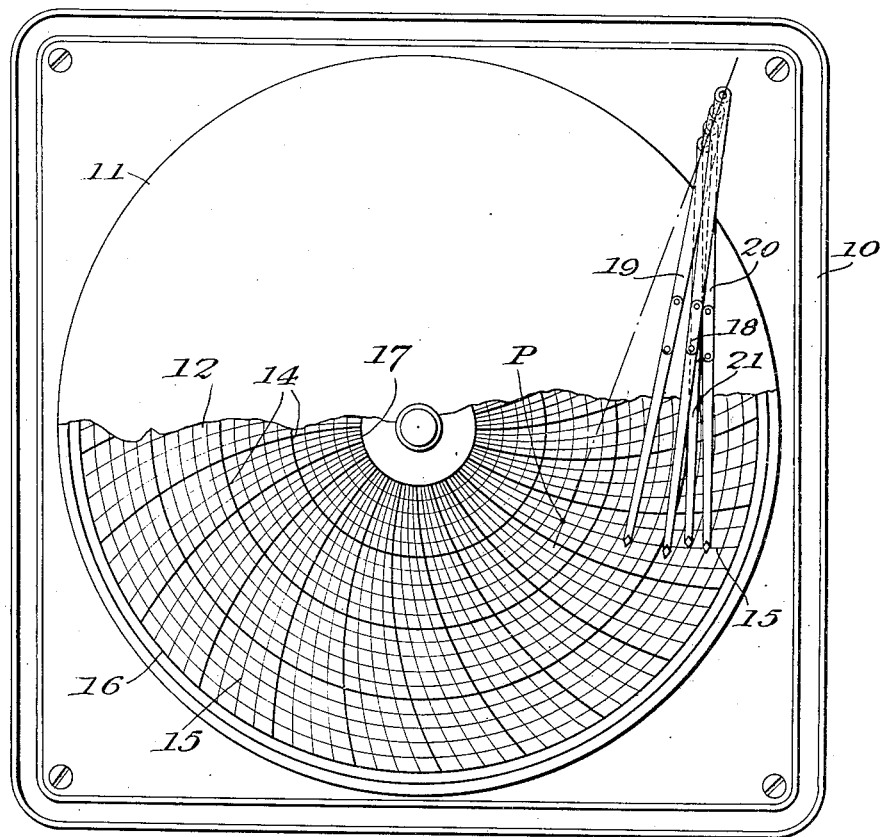
Figure 2:
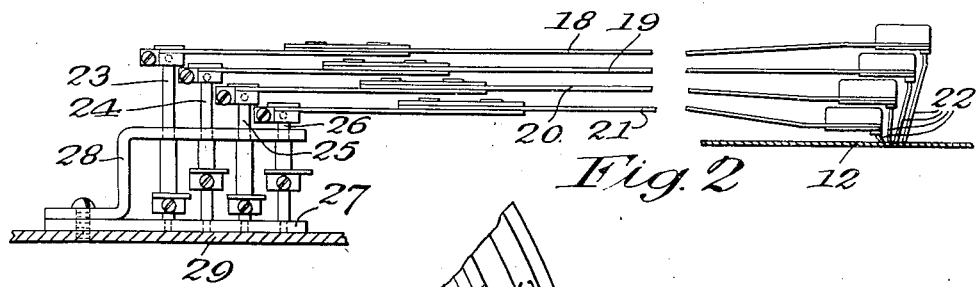
Fig. 2 is a detail elevational view of the mounting for the pen arms.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

A multiple pen instrument for obtaining records of temperatures, pressures, liquid level and the like embodying the invention is illustrated in the accompanying drawing and comprises a box-shaped casing 10 in which a disc 11 is suitably mounted for rotation. The disc 11 is rotated by any suitable clock mechanism (not shown). A chart 12 having circular graduations 14 representative of temperatures, pressures or liquid levels and the like is carried by the disc 11. A plurality of time curves 15 are formed upon the face of the chart extending between the outer and inner chart limits 16 and 17. These time curves have the same radius and are formed by subscribing lines about centers spaced equidistant upon a circle having the center of the chart as its center.

The instrument is also provided with a plurality of adjustable pen arms 18, 19, 20 and 21 of the usual type, each carrying at one end a pen point 22. The arms 18, 19, 20 and 21 are carried by shafts 23, 24, 25 and 26 respectively, which in turn are mounted for rotation in suitable bearings in a plate 27 and a bracket 28 which are suitably secured to the base 29 of the casing 10. The mounting for the shafts 23, 24, 25, and 26 is so arranged that the axis of each is located upon a line extending radially from a selected point P upon one of the time curves 15. The pen arms 18, 19, 20 and 21 are of such a length and the shafts 23, 24, 25 and 26 are so arranged that the units straddle one another. Preferably, the difference in length of adjacent pen arms in constant. The pen arms are adjusted so that the pen points 22 are positioned a minimum distance apart when the arms reach the point P.

Figure 3:
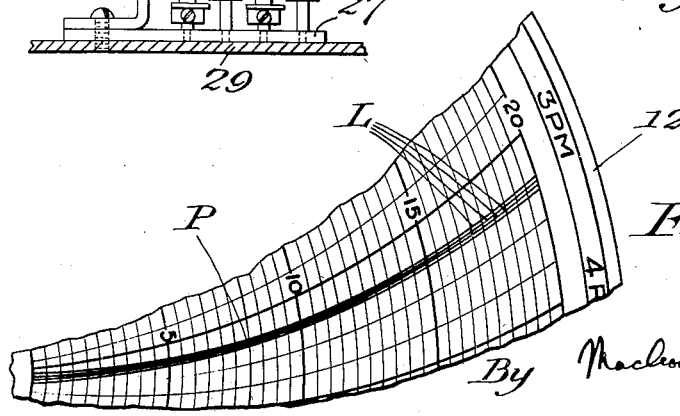
Fig. 3 is a fragmentary detail view of a portion of the chart.

With such an arrangement, if the chart is held stationary and a line is subscribed by each of the pen points, as indicated by the lines L in Fig. 3, the lines L will spread apart from the region adjacent the point P toward the outer limit of the chart. The time interval between the pen points when moving over this portion of the chart is small and constant. The point P in accordance with the invention may be selected at any point upon the time curve 15, but, preferably, it is located at a point about one-half to about two-thirds the distance from the outer to the inner chart limits inasmuch as it is in this portion of the chart that the most important indications occur. The invention not only makes possible a small and constant time interval between pen points over the major portion of the chart, but it also provides a simple mechanical construction wherein there is complete freedom of movement for each pen between the chart limits and wherein the units are readily accessible.

I claim:

1. In a multiple pen recorder having a circular chart, and means for rotating the chart about its center, said chart having a plurality of time curves of equal radius subscribed about centers equidistant from the center of the chart, in combination therewith a plurality of pen arms each pivotally mounted at one end and carrying a pen point at the other end, said pen arms being arranged in straddled relation and pivotally mounted on a line extending radially from a given point on one of said curves.

2. In a multiple pen recorder having a circular chart, and means for rotating the chart about its center, said chart having a plurality of time curves of equal radius subscribed about centers equidistant from the center of the chart, in combination therewith a plurality of pen arms each pivotally mounted at one end and carrying a pen point at the other end, said pen arms being arranged in straddled relation and pivotally mounted upon a line extending radially from a given point on one of said curves within the outer limits of the normal range of said pen arms on said curve.

3. In a multiple pen recorder having a circular chart, and means for rotating the chart about its center, said chart having a plurality of time curves of equal radius subscribed about centers equidistant from the center of the chart, in combination therewith a plurality of pen arms each pivotally mounted at one end and carrying a pen point at the other end, said pen arms being arranged in straddled relation and pivotally mounted on a line extending radially from a given point on one of said curves, said pen points being arranged so that they are positioned a minimum distance apart when the arms reach said point.

NIKOLAI BELAEF.